United States Patent [19]

Nishimura et al.

[11] Patent Number: 4,588,995

[45] Date of Patent: May 13, 1986

[54] MAGNETIC RECORDING MEDIUM

[75] Inventors: Nobuo Nishimura; Teruhiko Itami; Toshifumi Kimoto; Koichi Saitoh, all of Kanagawa, Japan

[73] Assignee: Fuji Xerox Co., Ltd., Japan

[21] Appl. No.: 617,404

[22] Filed: Jun. 5, 1984

Related U.S. Application Data

[62] Division of Ser. No. 376,993, May 11, 1982, Pat. No. 4,480,258.

[30] Foreign Application Priority Data

Jul. 19, 1981 [JP] Japan ............................... 56-106968

[51] Int. Cl.[4] .............................................. G01D 15/12

[52] U.S. Cl. .............................. 346/74.2; 346/76 PH; 346/1.1; 360/59

[58] Field of Search ................... 346/74.2, 74.4, 135.1, 346/136, 76 PH, 1.1; 360/59, 134

[56] References Cited

U.S. PATENT DOCUMENTS

| | | | |
|---|---|---|---|
| 3,562,760 | 2/1971 | Cushner et al. | 346/74.4 |
| 4,314,257 | 2/1982 | Tokunaga et al. | 346/74.4 |
| 4,442,441 | 4/1984 | Kikuchi et al. | 346/74.4 |

OTHER PUBLICATIONS

Higuchi et al., Magnetic Recording Tape with Double Layer Coatings, IEEE Transactions on Magnetics, Sep. 1977.

Nomura et al., Thermomagnetic Video Recordings, NHK Laboratories Notes, Mar. 1978, S.N. 224.

*Primary Examiner*—E. A. Goldberg
*Assistant Examiner*—A. Evans
*Attorney, Agent, or Firm*—Sughrue, Mion, Zinn, Macpeak, and Seas

[57] ABSTRACT

A magnetic recording medium for use in recording a magnetic latent image includes a high permeability layer having a low Curie point and a magnetic recording layer formed thereover. In use, the high permeability layer is selectively heated to the Curie point, so as to allow a magnetic signal to pass therethrough and be recorded on the recording layer.

9 Claims, 3 Drawing Figures

MAGNETIC RECORDING MEDIUM

This is a division of application Ser. No. 376,993, filed May 11, 1982, now U.S. Pat. No. 4,480,258.

BACKGROUND OF THE INVENTION

This invention relates to magnetic recording media, and more particularly to a magnetic recording medium which is employed in the technical field of magnetic printing or magnetography in which a magnetic latent image is formed and then visualized (e.g., developed).

Heretofore, two methods have been employed in forming a magnetic latent image.

In one of these methods, AC current modulated with an image signal is applied to a magnetic head which is in close contact with a belt-shaped magnetic recording medium, so that a magnetic latent image is formed according to the AC current. In the other method, DC current modulated with an image signal is applied to a heat generating element which is in close contact with a magnetic recording medium having a relatively low magnetic transformation point, so that a magnetic latent image is formed according to the DC current. In this case, an AC magnetic field is applied to the magnetic recording medium which is heated to higher than the magnetic transformation point.

In the first method described above, it is essential to drive a number of magnetic heads which are juxtaposed over the recording medium, in order to increase the recording speed. However, since the manufacture of such a magnetic head array requires a highly developed technology, the manufacturing cost is accordingly high. Thus, the first method is not practical.

On the other hand, a heat generating element array having a number of heat generating elements juxtaposed for use in the second method can be manufactured relatively readily. One example of the formation of a magnetic latent image according to the second method will be described with reference to FIG. 1.

A magnetic recording medium 1 having a relatively low magnetic transformation point is supported by a base layer 2 and is in the form of a belt. A heat generating element array 3 has a heat generating part 4 which operates while being in close contact with the recording medium. A current signal is applied to the array 3 according to image data in order to heat the magnetic recording medium 1 to a temperature higher than the magnetic transformation point. In this operation, AC current flows in a winding 6 on a magnetic head core 5, and an AC magnetic field is created in the gap of the core. When the magnetic recording medium 1 is cooled, thermal residual magnetization is caused, so that the AC magnetic field remains as a magnetization pattern in the medium 1. The magnetic recording medium in this method is made of $CrO_2$ for instance. However, in general, it is difficult to obtain chromium compounds because of environmental reasons. Furthermore, since the recording medium is prepared by coating, it is impossible to contain more than 30 to 40% $CrO_2$ magnetic particles having a magnetization characteristic in the recording medium, and therefore the use of $CrO_2$ is not suitable for the case where a high magnetization characteristic is required, or where recording must be carried out with high density.

SUMMARY OF THE INVENTION

In view of the above-described difficulties accompanying the prior art, an object of this invention is to provide a magnetic recording medium in which no special material such as $CrO_2$ need be used, and in which a magnetic pattern is formed according to a thermal pulse signal modulated with image data.

Another object of the invention is to provide a magnetic recording medium in which a film of sufficiently high magnetization density, such as an iron-cobalt vacuum evaporated film, is used as a magnetization recording layer, so that even a fine image pattern of high optical density can be developed.

The magnetic recording medium of the invention has a high permeability layer having a relatively low magnetic transformation point, and a magnetic recording layer of high residual magnetization density formed on the high permeability layer. The high permeability layer is made to be non-magnetic for a predetermined period of time by a heat generating element which is operated while being in contact with the magnetic recording layer, to control the direction of the lines of magnetic force from a magnetic head provided on a side of the magnetic recording medium opposite the side of the recording medium on which the heat generating element is disposed.

DETAILED DESCRIPTION OF THE PREFERRED EMBODIMENTS

Figure 1:
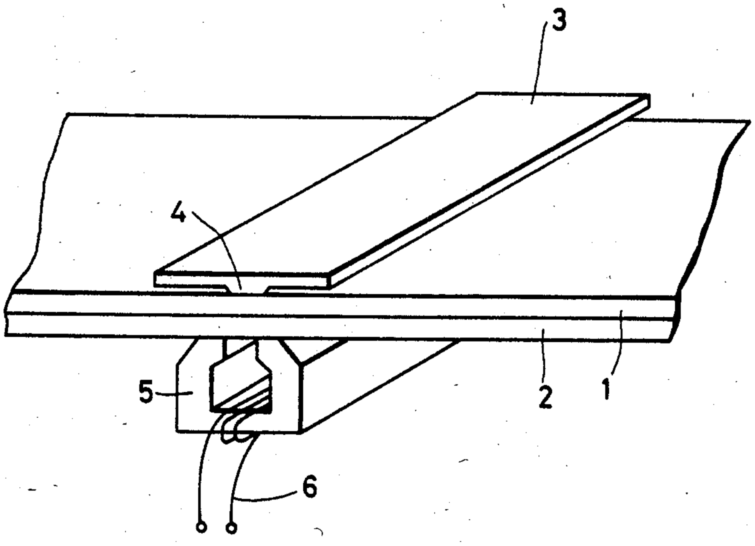
FIG. 1 PRIOR ART
FIG. 1 is a perspective view showing the principle of magnetic latent image formation as employed in conventional magnetography.
Figure 2:
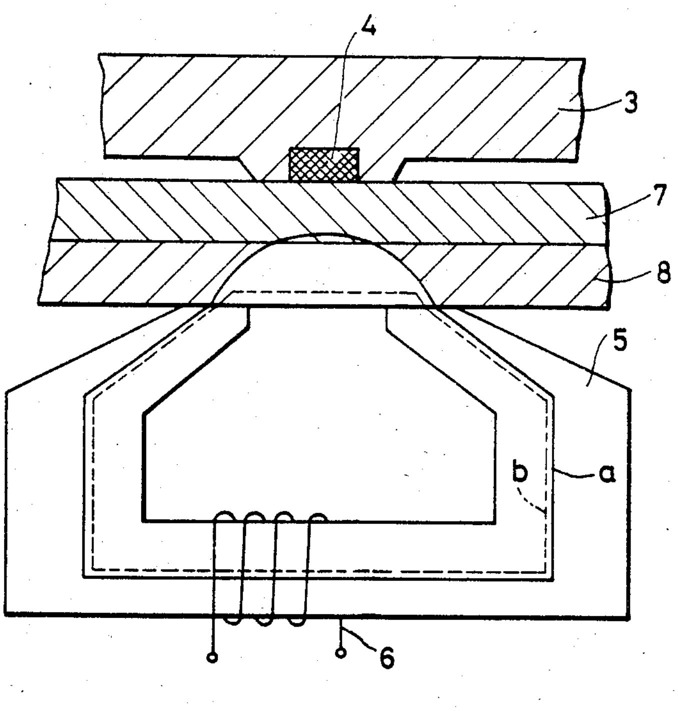
FIG. 2 is a sectional view showing one method of magnetic latent image formation using a magnetic recording medium according to this invention.

The magnetic recording medium according to this invention will be described with reference to the accompanying drawings. In FIG. 2, those components which have been previously described with reference to FIG. 1 are designated by corresponding reference numerals. AC current flows in the winding 6 at all times. The frequency of the AC current has an optimum value which is defined by the relative speed of the recording medium and the magnetic head, and the size of toner for developing. When no DC current flows in the heat generating unit 4, the magnetic field in the gap of the magnetic head core 5 acts effectively on a high permeability layer 8, and the path of the magnetic flux induced by the winding 6 is not formed in the magnetic recording layer 7 as is apparent from the magnetic path b in FIG. 2. When a DC current flows in the heat generating unit 4, the latter supplies thermal energy to the high permeability layer 8. It is desirable that the Curie point of the high permeability layer 8 be lower than 250° C. When the high permeability layer 8 is heated to substantially the magnetic transformation point, the high permeability layer 8 becomes non-magnetic and therefore the transmissivity of lines of magnetic force is increased. Therefore, the path of magnetic flux induced by the winding 6 extends proximate the gap of the magnetic head core 5 and into the magnetic recording layer 7, as is apparent from the path a in FIG. 2. If, in this case, the strength of the magnetic field is larger than the anti-magnetic-force (dipole strength) of the magnetic recording layer, a magnetic pattern is formed in the magnetic recording layer 7.

One concrete example of the magnetic recording medium according to the invention will be described with reference to FIG. 2. The high permeability layer 8 was made of NiO79Fe alloy of a thickness of 30 μm. The magnetic transformation point, i.e., the Curie temperature was 250° C. A magnetic recording layer 7 of Co-Ni-P alloy was formed on one side of the film-like alloy 8. All magnetic materials, except $CrO_2$, which are used for ordinary magnetic recording may be employed for the magnetic recording layer 7. The thickness of recording layer was 2μ. The magnetic head core 5 and the heat generating part 4 were arranged as shown in FIG. 2. In other words, the magnetic head core 5 was operated while being in contact with the exposed surface of the high permeability layer 8, while the heat generating unit 4 was operated while being in contact with the exposed surface of the magnetic recording layer 7. The relative speed between the recording medium and the heat generating part 4 and accordingly the magnetic head core 5 was 19 cm/sec. The frequency of the sinusoidal current applied to the winding 6 was 1 KHz. That is, the magnetization wavelength, which remains as a two-dimensional pattern, was 190 μm. The magnetic latent image which was formed under these conditions was visualized with magnetic toner. The image thus visualized had an optical density (ID) of more than 1.1. Thus, it has been demonstrated that the recording medium of the invention processes sufficiently high image forming ability.

The high permeability layer of the magnetic recording medium of the invention may be made of an oxide compound such as NiZn ferrite as well as the material described in the example. In the case where the high permeability layer is made of such an oxide compound, it is difficult to provide the high permeability layer in film form, and therefore a method of applying ferrite particles to a plastic support is employed. In this connection, it is essential to make the plastic support thin to thereby effectively introduce the magnetic field from the magnetic head to the magnetic recording layer.

Figure 3:
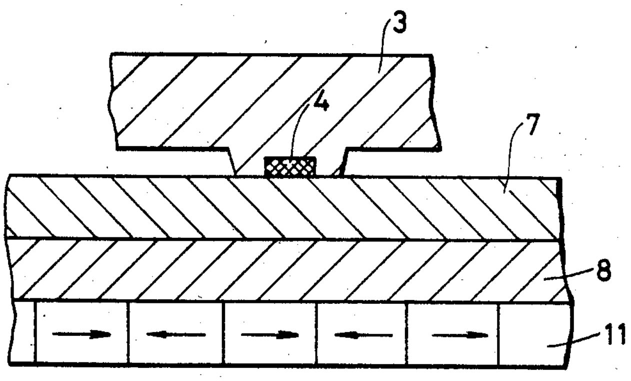
FIG. 3 is a sectional view showing another method of magnetic latent image formation using the magnetic recording medium according to the invention.

In the above embodiment of the invention, relative movement between the magnetic head and the magnetic recording medium is employed to form the magnetic pattern. However, a magnetic field leaked from a master magnetic layer 11, in the entire surface of which a magnetic pattern has been recorded in advance, may be employed for the formation of an image signal magnetic pattern, as illustrated in FIG. 3.

In either of the above-described cases, a high permeability material having a relatively low magnetic transformation point is heated, to control the magnetic field applied to the magnetic recording layer.

As is apparent from the above description, no special material such as $CrO_2$ is used in providing the magnetic recording medium of the invention. That is, materials which are not environmentally harmful and which are readily available are used to form the recording medium. A magnetic pattern is formed on the recording medium thus formed, according to a thermal pulse signal which is modulated with image data.

The use of the recording medium according to the invention makes it possible to obtain a recording of sufficiently high magnetization density, i.e., a recording which is of high optical density after development, and to thus form a delicate image pattern. These features are made possible by the fact that, in the invention, the selection of materials for the magnetic recording layer is not at all limited.

What is claimed is:

1. A method of forming a magnetic latent image, comprising:

providing a recording medium having at least a high permeability layer possessing a low Curie temperature, and a magnetic recording layer;

disposing a heat generating element in close contact with said recording layer;

applying heating pulses modulated with image data to said element;

disposing a magnetic recording head on a side of said recording medium opposite said element; and selectively heating said high permeability layer at least up to said Curie point according to said image data, to thereby temporarily render said high permeability layer non magnetic, whereby a magnetic recording signal from said head may be applied through said high permeability layer to said recording layer.

2. A method of forming a magnetic latent image, comprising:

providing a recording medium having a first layer of high permeability with a Curie point on the order of 250° C., and having a magnetic layer formed on said first layer;

applying a magnetic recording signal to said first layer; and selectively heating said first layer to control the formation of a magnetic latent image on said magnetic layer, said first layer preventing recording upon said magnetic layer when the temperature of said first layer is below said Curie point and allowing recording upon said magnetic layer when the temperature of said first layer is above said Curie point.

3. A method of thermomagnetic recording of image data, comprising:

providing a recording medium having a magnetic recording layer for recording said image data and a high permeability recording control layer having a relatively low Curie point and having first and second sides, with said second side contacting said magnetic recording layer;

applying a magnetic recording signal to said second side of said recording control layer; and selectively heating at least said recording control layer in accordance with image data to be recorded, said recording control layer preventing said image data from being recorded on said magnetic recording layer when said recording control layer is at a temperature below said Curie point and allowing said image data to be recorded on said magnetic recording layer when said recording control layer is heated to a temperature above said Curie point.

4. A method as claimed in claim 1, wherein said high permeability layer, at temperatures below its Curie temperature, has a permeability higher than the permeability of said magnetic recording layer.

5. A method as claimed in claim 2, wherein said first layer, at temperatures below its Curie point, has a permeability higher than the permeability of said magnetic layer.

6. A method as claimed in claim 3, wherein said recording control layer, at temperatures below its Curie point, has a permeability higher than that of said magnetic recording layer.

7. A method as claimed in claim 1, wherein said high permeability layer, at temperatures below its Curie temperature, substantially blocks the passage of flux from said magnetic recording head to said magnetic recording layer.

8. A method as claimed in claim 2, wherein said first layer, at temperatures below its Curie point, substantially blocks the passage of said magnetic recording signal to said magnetic layer.

9. A method as claimed in claim 3, wherein said recording control layer, at temperatures below its Curie point, substantially blocks the passage of said magnetic recording signal to said magnetic recording layer.

* * * * *